(12) United States Patent
Dossenback

(10) Patent No.: US 12,397,596 B1
(45) Date of Patent: Aug. 26, 2025

(54) SHOPPING CART COUPLING SYSTEM FOR MOTORIZED SCOOTERS

(71) Applicant: Kenneth Dossenback, Springfield Township, OH (US)

(72) Inventor: Kenneth Dossenback, Springfield Township, OH (US)

(*) Notice: Subject to any disclaimer, the term of this patent is extended or adjusted under 35 U.S.C. 154(b) by 512 days.

(21) Appl. No.: 17/973,152

(22) Filed: Oct. 25, 2022

(51) Int. Cl.
*B60D 1/18* (2006.01)
*B60D 1/54* (2006.01)
*B60D 1/00* (2006.01)

(52) U.S. Cl.
CPC .............. *B60D 1/187* (2013.01); *B60D 1/54* (2013.01); *B60D 2001/005* (2013.01); *B60D 2001/546* (2013.01)

(58) Field of Classification Search
CPC . B60D 1/187; B60D 1/18; B60D 1/54; B60D 2001/005; B60D 2001/546
See application file for complete search history.

(56) References Cited

U.S. PATENT DOCUMENTS

| | | | | |
|---|---|---|---|---|
| 3,740,079 | A  * | 6/1973 | Skinner | B60D 1/18 |
| | | | | D12/162 |
| 7,867,049 | B1 * | 1/2011 | Doffay | B63B 35/58 |
| | | | | 441/40 |
| 9,150,064 | B1 * | 10/2015 | Landreth | B60D 1/145 |
| 9,308,790 | B1 * | 4/2016 | Sharp | B60D 1/167 |
| 10,308,085 | B2 * | 6/2019 | Conger | B60D 1/18 |
| 10,703,150 | B2 * | 7/2020 | Smith | B60D 1/187 |
| 11,383,565 | B1 * | 7/2022 | Bruno | B62B 5/002 |
| 2022/0348048 | A1 * | 11/2022 | Bruno | B60D 1/54 |

* cited by examiner

*Primary Examiner* — John D Walters
(74) *Attorney, Agent, or Firm* — Sanchelima & Associates, P.A.; Jesus Sanchelima; Christian Sanchelima

(57) ABSTRACT

A shopping cart coupling system for motorized scooters including a base hooking assembly with a pulling assembly and a hooking assembly. Base hooking assembly includes a first eye bolt, a second eye bolt attached to a rear portion of a motorized scooter. Pulling assembly includes a first chain and a second chain attached to the first and second eye bolts by means of carabiner hooks. First and second chains are attached in a cross orientation to a front portion of a shopping cart by means of swivel hooks. The swivel hooks can be disengaged from the shopping cart to be attached to the first and second eyebolt for convenient transportation.

11 Claims, 3 Drawing Sheets

SHOPPING CART COUPLING SYSTEM FOR MOTORIZED SCOOTERS

BACKGROUND OF THE INVENTION

1. Field of the Invention

The present invention relates to shopping cart coupling systems and, more particularly, to a shopping cart coupling system for motorized scooters that includes a set of chains with attachment fasteners disposed on each end of the chains to releasably couple a shopping cart to tow it.

2. Description of the Related Art

Several designs for shopping cart coupling systems have been designed in the past. None of them, however, include connected metal links with a set of fasteners attached on the edges.

Applicant believes that a related reference corresponds to U.S. Pat. No. 11,383,565 issued for tow bar or scooter. Applicant believes that another related reference corresponds to U.S. Pat. No. 9,150,064 issued for scooter and cart connection device. None of these references, however, teach of a pair of chain assemblies with attachment clips disposed on each end of both chains where the chains are used to releasably couple a shopping cart to the rear of a motorized scooter allowing the scooter to tow the cart behind it.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to increase a user's mobility when shopping without assistance.

It is another object of this invention to provide encouragement to those who may have a disability when they need to go shopping.

It is still another object of the present invention to simplify a shopping routine.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
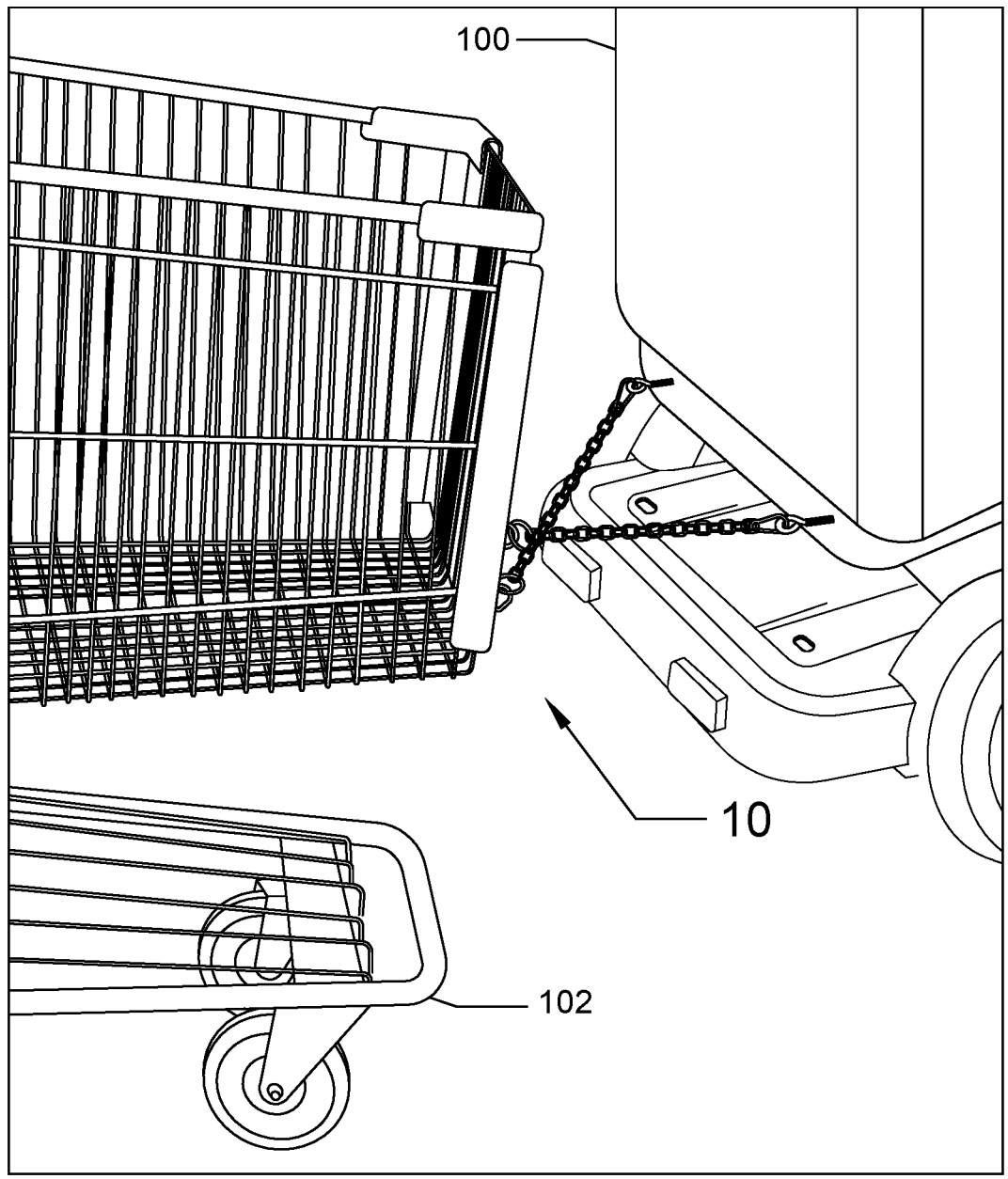
FIG. 1 represents an operational view of an exemplary embodiment of the present invention 10.

Referring now to the drawings, where the present invention is generally referred to with numeral 10, it can be observed that it basically includes a base hooking assembly 20, a pulling assembly 40, a hooking assembly 60 and various exemplary embodiments (100) thereof. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Base hooking assembly 20 includes a first eye bolt 22, a second eye bolt 24, a first carabiner hook 26 and a second carabiner hook 28. In an exemplary embodiment, first eye bolt 22 may be a threaded bolt with a loop at one end well known in the art. Nonetheless, it should be considered that other fasteners with a loop or a hook at one end may be suitable for first eye bolt 22. First eye bolt 22 may have a suitable size to be attached in a rear portion of a motorized scooter 100, wherein the first eye bolt 22 may be secured to the motorized scooter 100 by means of the threaded portion thereof. In a suitable embodiment, second eye bolt 24 may be a threaded bolt with a loop at one end well known in the art. Nevertheless, it should be considered that other fasteners with a loop or a hook at one end may be suitable for second eyebolt 24. Second eye bolt 24 may have a suitable size to be attached in a rear portion of a motorized scooter 100, wherein the second eye bolt 24 may be secured to the motorized scooter 100 by means of the threaded portion. First eye bolt 22 and second eye bolt 24 are placed in opposite edges of the motorized scooter 100, wherein First eye bolt 22 and second eye bolt 24 are placed in the same horizontal axis. In a suitable embodiment first carabiner hook 26 may be a loop with a spring-loaded gate. Nevertheless, it should be considered that other fasteners like a carabiner hook with screw, a carabiner with oval straight gate or any other variation thereof may be suitable for first carabiner hook 26. The size of the first carabiner hook 26 may be suitable to be connected to the first eye bolt 22 by means of the loop thereof. In other embodiments, second carabiner hook 28 may be a loop with a spring-loaded gate. Nevertheless, it should be considered that other fasteners like a carabiner hook with screw, a carabiner with oval straight gate or any other variation thereof may be suitable for second carabiner hook 28. The size of the second carabiner hook 28 may be suitable to be connected to the second eye bolt 24 by means of the loops thereof.

Pulling assembly 40 includes a first chain 42 and a second chain 44. In one embodiment, first chain 42 is a serial assembly of connected links, wherein the first chain 42 may have a suitable size to be connected to the first carabiner hook 26. The first chain 42 may be made of a plastic material, a steel material, an aluminum material, or any other suitable material that can support a pulling stress force. In a preferred embodiment, the length of the first chain 42 may be suitable to couple a shopping cart 102 to the motorized scooter. In a suitable embodiment, second chain 44 is a serial assembly of connected link, wherein the second chain 44 may have a suitable size to be connected to the second carabiner hook 28. The second chain 44 may be made of a plastic material, a steel material, an aluminum material, or any other suitable material that can support a pulling stress force. In one embodiment, the length of the second chain 44 may be suitable to couple a shopping cart 102 to the motorized scooter. Best depicted in FIG. 1.

Figure 2:
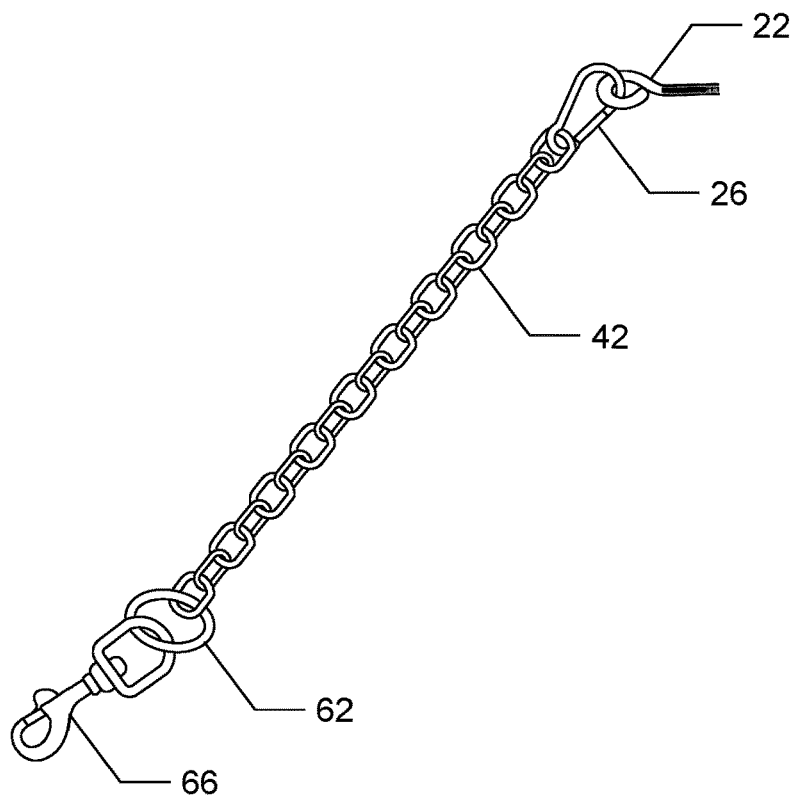
FIG. 2 shows an isometric view of one embodiment of the first eye bolt 22, the first carabiner hook 26, the first chain 42, the first metal ring 62, and the first swivel hook 68 coupled therebetween.

Hooking assembly 60 may include a first metal ring 62, a second metal ring 64, a first swivel hook 66 and a second swivel hook 68. In an exemplary embodiment, first metal ring 62 may be a cylinder ring, a keyring or any other suitable variation thereof. First metal ring 62 may have a suitable circumference and width to be connected to the first chain 42 by means of an aperture included in the first metal ring 62. As illustrated in FIG. 2. In a suitable embodiment, second metal ring 62 may be a cylinder ring, a keyring or any other suitable variation thereof. Second metal ring 64 may have a suitable circumference and width to be connected to the second chain 44 by means of an aperture included in the second metal ring 62. In a preferred embodiment, first swivel hook 66 may have a spring-loaded latch that opens when pressing down the latch and closes automatically when releasing the pressure on its latch. First swivel hook 62 may have a free loop wherein the loop may rotate and the hook of the first swivel hook 62 may maintain its position. In a suitable embodiment, first swivel hook 66 may be attached to the first metal ring 42, wherein the loop of the first swivel hook 66 is coupled to the first metal ring 62 by means of the aperture thereof. As shown in FIG. 2. In an exemplary embodiment, second swivel hook 68 may have a spring-loaded latch that opens when pressing down its latch and closes automatically when releasing the pressure on the latch. Second swivel hook 68 may have a free loop wherein the loop may rotate and the hook of the second swivel hook 68 may maintain its position. In a suitable embodiment, second swivel hook 68 may be attached to the second metal ring 44, wherein the loop of the second swivel hook 68 is coupled to the second metal ring 64 by means of the aperture thereof.

Figure 3:
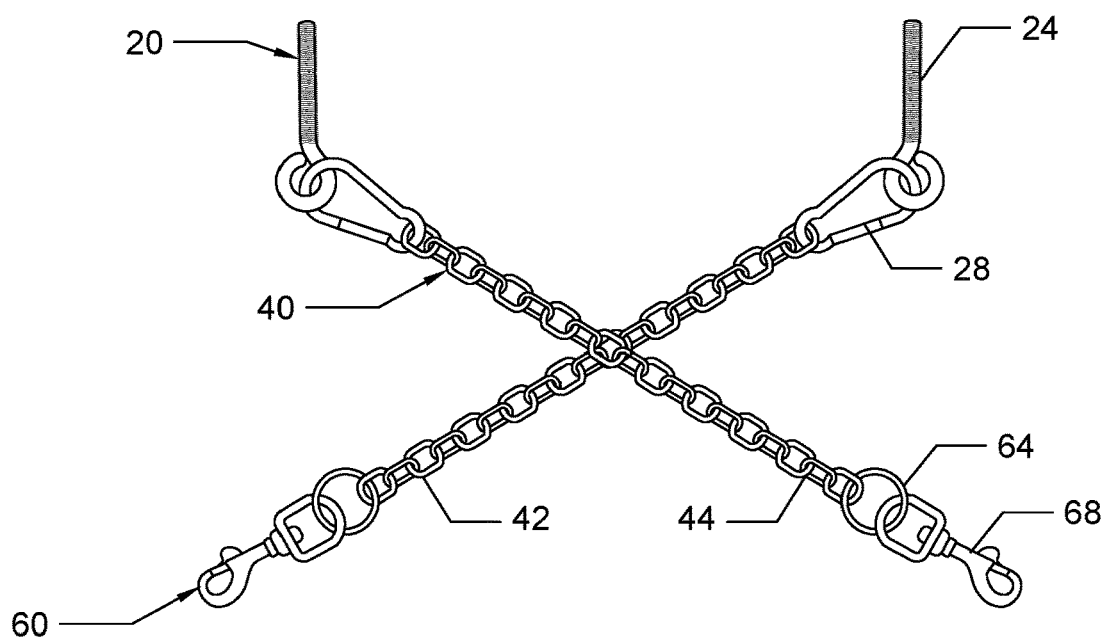
FIG. 3 illustrates a top view of the present invention 10, wherein the first chain 42 and second chain 44 chains are placed in a cross style when coupled.
Figure 4:
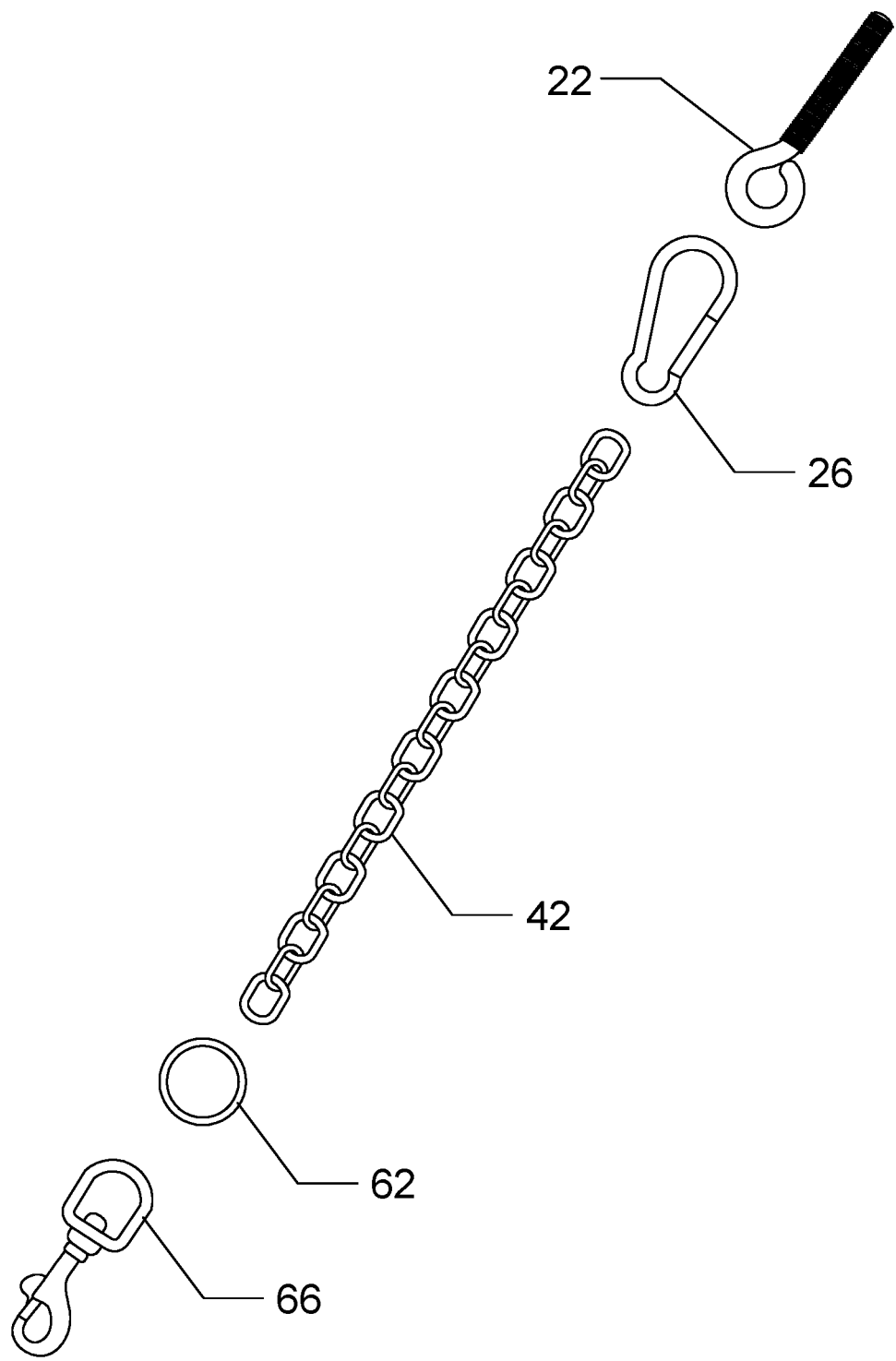
FIG. 4 is a representation of an exploded view of the base hooking assembly 20, the pulling assembly 40, and the hooking assembly 60.

FIG. 3 represents the assembly between the first eye bolt 22, the first carabiner hook 26, the first chain 42, the first metal ring 62 and the first swivel hook 66, wherein the first eye bolt 22, may be attached to a rear portion of the motorized scooter 100 and the first swivel hook 66 may be attached to a front portion of the shopping cart 102. In a preferred embodiment, the second carabiner hook 28, the second chain 44, the second metal ring 64 and the second swivel hook 68 are connected such as the first elements herein described. FIG. 3 illustrates the base hoking assembly 20, the puling assembly 40 and the hooking assembly 60 connected therebetween in a cross orientation to be attached to the shopping cart 102 allowing the motorized scooter 100 to pull the shopping cart 102 in the same orientation as thereof 102 and preventing unintended lateral movements of the shopping cart 102.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A shopping cart coupling system for motorized scooters, comprising:
   a base hooking assembly including a first eye bolt, a second eye bolt, wherein said first eye bolt and said second eye bolt are attached to a motorized scooter, said hooking assembly further includes a first carabiner hook and a second carabiner hook;
   a pulling assembly including a first chain and a second chain, wherein said first chain and said second chain have a symmetrical length therebetween; and
   a hooking assembly having a first metal ring, a second metal ring, a first swivel hook and a second swivel hook, wherein said first metal ring is attached to an edge of said chain, said second metal ring is attached to an edge end of said second chain, said first swivel hook is attached to said first metal ring and said second hook is attached to said second metal ring.

2. The shopping cart coupling system for motorized scooters of claim 1, wherein said first eye bolt and said second eye bolt have a threaded portion and a loop at one end.

3. The shopping cart coupling system for motorized scooters of claim 1, wherein said first carabiner hook and said second carabiner hook have a spring-loaded gate that opens when pushing the gate and closes automatically.

4. The shopping cart coupling system for motorized scooters of claim 1, wherein said first metal ring and second metal ring include an aperture.

5. The shopping cart coupling system for motorized scooters of claim 4, wherein said apertures need to be tensioned to increase the area of the apertures.

6. The shopping cart coupling system for motorized scooters of claim 1, wherein said first swivel hook has a spring-loaded latch that opens when pressing down the latch and closes automatically when releasing the pressure on the latch.

7. The shopping cart coupling system for motorized scooters of claim 1, wherein said second swivel hook has a spring-loaded latch that opens when pressing down the latch and closes automatically when releasing the pressure on the latch.

8. The shopping cart coupling system for motorized scooters of claim 1, wherein said first swivel hook includes a free loop that rotates independently from the first swivel hook.

9. The shopping cart coupling system for motorized scooters of claim 1, wherein said second swivel hook includes a free loop that rotates independently from the second swivel hook.

10. A shopping cart coupling system for motorized scooters, comprising:
    a base hooking assembly including a first eye bolt, a second eye bolt, wherein said first eye bolt and said second eye bolt are attached to a rear portion of a motorized scooter, said hooking assembly further includes a first carabiner hook coupled to said first eye bolt and a second carabiner hook coupled to said second eye bolt;
    a pulling assembly including a first chain and a second chain, wherein said first chain and said second chain have a symmetrical length therebetween, said first chain is attached to said first carabiner hook and said second chain is attached to said second carabiner hook; and
    a hooking assembly having a first metal ring, a second metal ring, a first swivel hook and a second swivel hook, wherein said first metal ring has an aperture, said first metal ring is attached to an edge of said first chain, said second metal ring has an aperture, said second metal ring is attached to an edge of said second chain, said first swivel hook has a spring-loaded hatch, said, said first swivel hook is attached to said first metal ring and said second hook has a spring-loaded hatch, said second hook is attached to said second metal ring.

11. A shopping cart coupling system for motorized scooters, consisting of:
- a base hooking assembly including a first eye bolt, a second eye bolt, wherein said first eye bolt is attached to a rear portion of an edge of a motorized scooter, said second eye bolt is attached to a rear portion of an opposite edge of said motorized scooter, said first eye bolt and said second eye bolt are attached in the same horizontal axis, said hooking assembly further includes a first carabiner hook coupled to said first eye bolt and a second carabiner hook coupled to said second eye bolt;
- a pulling assembly including a first chain and a second chain, wherein said first chain and said second chain have a symmetrical length therebetween, said first chain is attached to said first carabiner hook, said second chain is attached to said second carabiner hook, said first chain and said second chain are made of a steel material; and
- a hooking assembly having a first metal ring, a second metal ring, a first swivel hook and a second swivel hook, wherein said first metal ring has an aperture, said first metal ring is attached to an opposite edge of said first chain, said second metal ring has an aperture, said second metal ring is attached to an opposite edge of said second chain, said first swivel hook has a spring-loaded hatch, said, said first swivel hook has a free loop that rotates independently, wherein said first metal ring is attached to said free loop of said first swivel hook, said second swivel hook has a free loop that rotates independently, wherein said second metal ring is attached to said free loop of said second swivel hook, said second hook has a spring-loaded hatch, said first swivel hook and said second swivel hook are attached to a shopping cart.

* * * * *